(No Model.)

L. R. BROOKS.
CAR WHEEL.

No. 353,918.　　　　　　　　Patented Dec. 7, 1886.

WITNESSES　　　　　　　　INVENTOR
Alex Mahon　　　　　　　　L. R. Brooks
C. G. Trevitt　　　　　　　By H. N. Jenkins
　　　　　　　　　　　　　　　Attorney

UNITED STATES PATENT OFFICE.

LEONARD R. BROOKS, OF BIRMINGHAM, ALABAMA.

CAR-WHEEL.

SPECIFICATION forming part of Letters Patent No. 353,918, dated December 7, 1886.

Application filed May 14, 1884. Serial No. 131,492. (No model.)

*To all whom it may concern:*

Be it known that I, LEONARD R. BROOKS, a citizen of the United States, residing at Birmingham, county of Jefferson, State of Alabama, have invented new and useful Improvements in Car-Wheels, of which the following is a full and exact description, reference being had to the accompanying drawings, making part of this specification.

This invention relates more especially to that class of car-wheels which are known as "mine-wheels;" but it is evident that the improvements made therein may be applied with like benefit to all wheels which turn upon their axles.

The object of the invention is to effectually exclude all dust and dirt from the journal-bearing, as well as to provide for an increased durability of the wheel proper; and it consists in the combination, with an axle having end journals provided with inner collars, of wheels having central chambers or pockets, and detachable hubs adapted to connect with the open ends of same, the face of each hub provided around the journal-bearing thereof with a recess of greater diameter and depth than the axle-collars, a pin and washer for securing each hub on its journal, and a series of bolts for securing together the hubs and wheels, as hereinafter more fully set forth.

Figure 1:
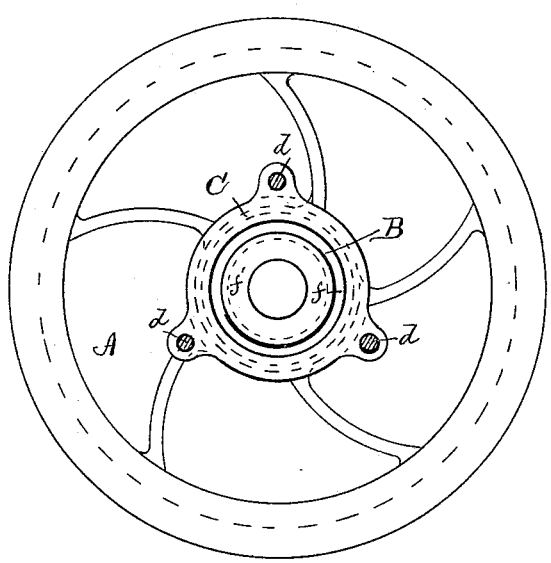
Figure 2:
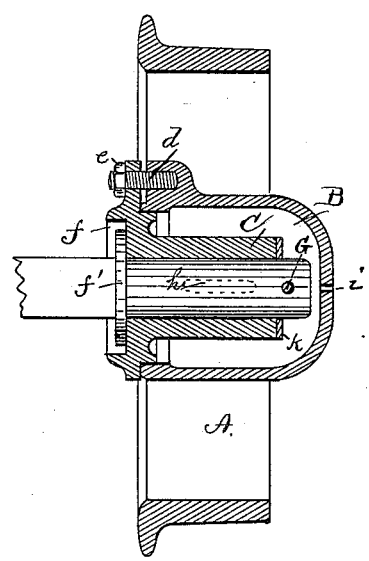

In the accompanying drawings, Figure 1 represents the inner side of a wheel provided with my improvement, and Fig. 2 a vertical cross section of the same.

A designates a wheel, in the center of which is cast or otherwise produced an annular chamber or pocket, B, having its mouth or opening located at the inner or flanged side of the wheel, while its base or rear is rounded outward from the outer surface thereof, so as to give sufficient depth for the bearing or hub C, the latter adapted to fit neatly over the aforesaid mouth and to be secured in said position by means of studs or bolts and nuts, as shown at *d e*.

The hub C is bored to receive the axle-journal, and a recess, *f*, is made in its face for the reception of the axle-collar *f'*. The latter is of less diameter and depth than the aforesaid recess, in order that the dust and dirt which falls from the sides of the wheel may be guided clear of same, and thus be prevented from working in between the collar and hub, and thence into the journal-bearing and lubricant-receptacle. At suitable distances apart a series of elongated slots, *h*, are made in the hub to permit the lubricant to flow to all parts of the axle. The lubricant is introduced into the chamber or pocket through a hole made at the base thereof, as shown at *i*, the said hole to be provided with a suitable plug, so as to exclude dust and dirt therefrom.

*k* is a washer, which is fitted over the end of the axle and against the end of the hub, where it is held in place by a pin or key, G, which serves to prevent any endwise movement of the wheel on its axle.

The merits of this invention consist in the simplicity of its construction and ease with which the hub can be replaced when too much worn for use, the thorough and effectual means for lubricating the axle-journal and excluding dust and dirt therefrom, and the entire freedom of the outer surface of the wheel from bolts, nuts, or other obstructions.

I am aware that car-wheels have been made with pockets or receptacles and detachable hubs adapted to fit therein, as in the patent to S. Stutz, No. 173,369. I therefore do not claim said features as my invention; but, Having described my invention, what I claim as new, and desire to secure by Letters Patent, is—

The combination of a car-wheel having a central chamber or pocket, and a detachable hub having a recess in the face thereof, an axle having a journal adapted to fit the hub, and a collar of less diameter and width than the diameter and depth of the aforesaid recess, with means for holding the wheel on the axle, substantially as described, and for the purpose set forth.

In testimony whereof I affix my signature in presence of two witnesses.

LEONARD R. BROOKS.

Witnesses:
HARRY HARSH,
H. PLOEGER.